Nov. 28, 1944. L. A. COLLINS 2,363,502
METHOD OF AND APPARATUS FOR MAKING AND RECREATING RECORDS
Filed Dec. 31, 1941 2 Sheets-Sheet 1
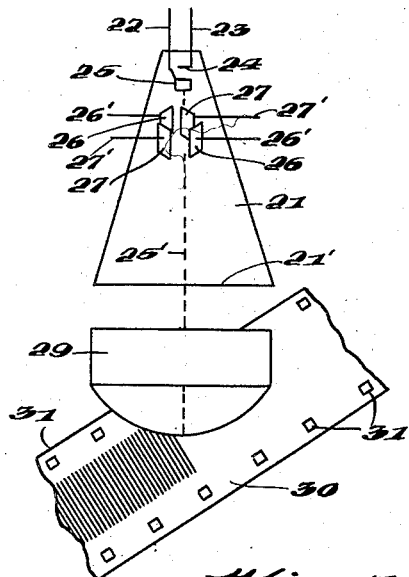
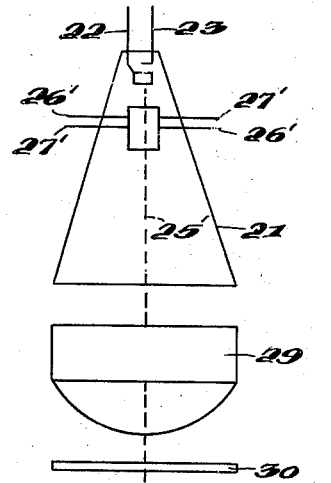
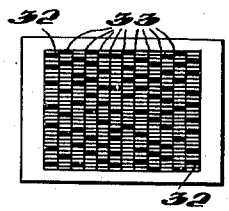
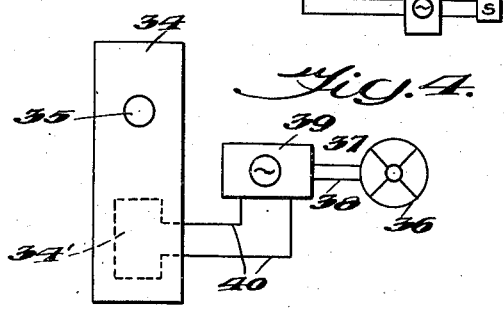
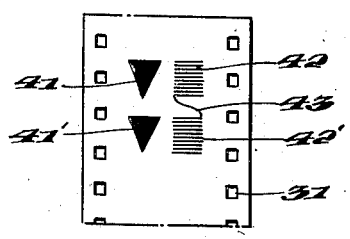
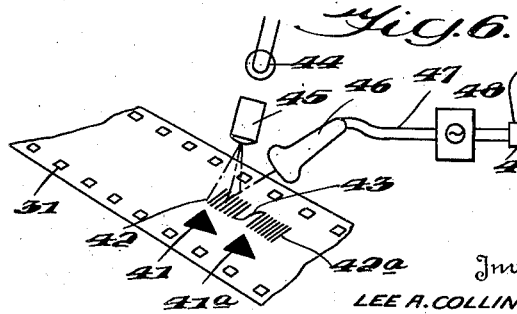
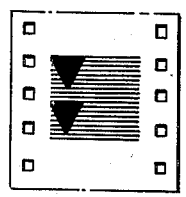
Inventor
LEE A. COLLINS,
By Chas. W. Funkhouser
Attorney

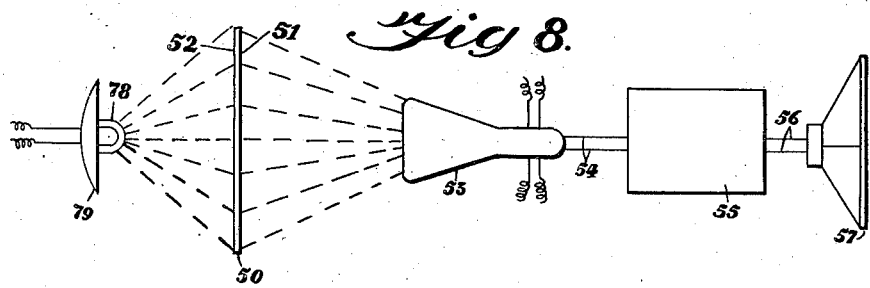
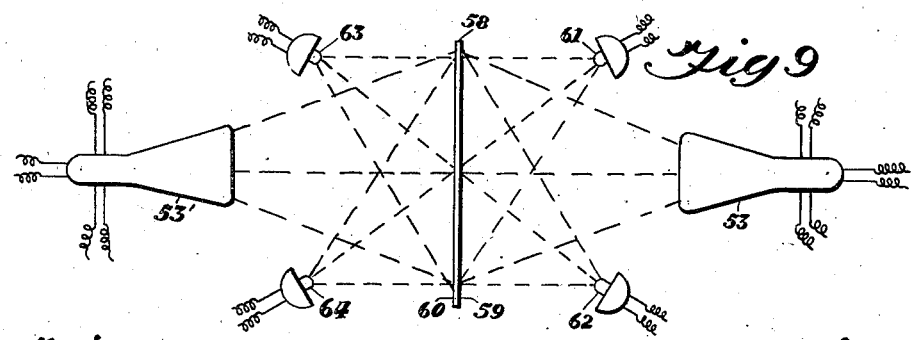
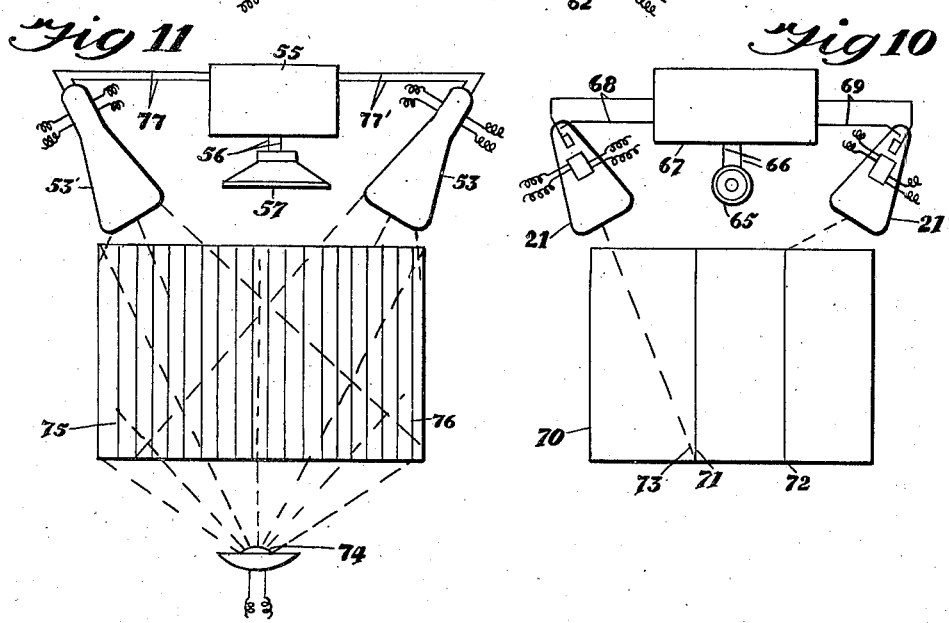

Patented Nov. 28, 1944

2,363,502

UNITED STATES PATENT OFFICE 2,363,502

METHOD OF AND APPARATUS FOR MAKING AND RE-CREATING RECORDS

Lee A. Collins, Louisville, Ky.

Application December 31, 1941, Serial No. 425,217

7 Claims. (Cl. 178—5.6)

The present invention relates to improvements in methods of and apparatus for making and/or re-creating records as shown in my copending application Serial No. 296,482, filed September 25, 1939, of which this application is a continuation-in-part.

One important object of the present invention is to employ high frequency electric impulses to make and/or re-create superior quality sound and image records either singly or in combination.

Another object of the invention is to provide a novel method of transmitting sound or image records to distant points for simultaneous recording and/or audible reproduction as desired.

A further object of the invention is to provide a novel method of making composite sound and image records so as to conserve space on the record material.

These and other objects of the invention will be more apparent from the following specification and drawings and more particularly set forth in the claims.

In the drawings:

Fig. 1 is a diagrammatic view of a recording apparatus arranged to record sound or image impulses in accordance with the present invention.

Fig. 2 is a diagrammatic view of the apparatus shown in Fig. 1 adapted for reproducing a record.

Fig. 3 is a diagrammatic view illustrating a modified type of sound record capable of being re-created by a scanning beam.

Fig. 4 is a diagrammatic view of apparatus illustrating the photographing of images and sound recordings in accordance with the present invention.

Fig. 5 is a diagrammatic view illustrating the surface of a record produced by the apparatus in Fig. 4.

Fig. 6 is a diagrammatic view illustrating another method of re-creating sound recordings;

Fig. 7 is a diagrammatic view illustrating a composite image and sound record; and Figs. 8 to 11 illustrate other embodiments of applicant's invention.

The novel feature of re-creating sound records by the method of scanning provides many advantages over old methods of re-creating sound records in addition to the high quality results obtained in using high frequency currents among which is more compact recordings when arranged on a strip of film, etc.

Since sound records of the present invention may be scanned in to and fro motion in the making and in the re-creating, the whole allotted width of the record-material for the recordings is used and it will be of shorter length or width, depending on the amount of recordings, than sound recordings of other types would be outstretched on a strip or other record material. The advantages of short length recordings produced by utilizing the width as well as the length in applying the invention to photographic film strips are many and some advantages are set forth hereinafter. One important advantage is in the production of motion pictures wherein the number of moving picture exposures were increased from 16 to 24 per second when sound was added to the moving picture art for providing ample running length for satisfactory sound recording, it is now possible with the use of the present sound records to decrease the number of picture exposures per second. This saving is occasioned by registering and recreating 16 pictures per second as in the past when silent pictures alone were used, thereby reducing the cost of production of moving picture films several million dollars annually and with the added feature of high quality sound produced by high frequency recording and re-creating.

The records made in accordance with the present invention may be produced photographically by any suitable type of scanning apparatus and method of operation by modulating or varying its light beam intensity, or by such variations in accordance to sound when invisible radiations are used for producing records photographically. One type of scanning apparatus is shown in the drawings for producing records of sound, with and without images, but the invention is not limited to this particular apparatus. Neither is the invention limited to the scanning apparatus shown in the drawings for re-creating records, in fact, it is preferable, when cost is no object, to use the type of cathode ray known by the trade name "iconoscope." This type of tube has photo-sensitive elements constructed therein and its scanning beam also included therein and is capable of functioning in a highly efficient manner when it is focused by means of an optical system to an illuminated sound record with and without images therewith. Also, scanners of this type and similar types may function by invisible radiations reflected from the records to it; also, records may be re-created by invisible radiations projected from a scanning apparatus through the recordings to a photo-sensitive element.

One example of re-creating by scanning a considerable amount of sound made condensed by running across a record material from beginning to ending is when a single image is projected for a longer period of time than in regular moving picture timing, and in such records the sounds may be made and re-created at a lower frequency than when with moving picture images that are made and projected for only a brief period of time. When more time is required for sound re-creation with a still image being projected and when on a standardized record material the sound recordings would of necessity be by a lower frequency than sound recordings with moving pictures produced on a similar sized material. In any event, sound re-creation by scanning provides more space for sound recordings accompanying image records and a higher quality sound.

In one application of my invention the records after being recorded at high frequency and finished for re-creation, they may then be transmitted to distant points at a lower frequency or a slower frequency and the timing of the transmitting may be for a far greater period than the time required in making the records of sound and images together or separate. The advantages of such a method in transmitting are many and will be of high value in the art of transmitting television enactments to distant points that would be impossible to reach by transmitting through space at high frequency, or ultra high frequency, as it is sometimes classed, and as employed in broadcasting television images, newspages, etc. It is a known fact that the higher frequency channels are only reliable in reaching about 50 miles through space and that the lower frequencies reach far greater distances, even a thousand or more miles. Therefore, the records made at the higher frequencies may be transmitted to distant points at lower frequencies by slower functioning.

Referring to Figs. 1 and 2 of the drawings there is shown diagrammatically a form of reproducing apparatus embodying the present invention. This apparatus includes a scanning device indicated by a cathode ray tube indicated by the numeral 21. This tube is provided with lead wires 22 and 23 which may connect with a television receiving set or any other conventional type of amplifier (not shown) for receiving electrical impulses. The tube is provided with a cathode 24 and an anode 25 which shall project on the end of the tube 21 an image resulting from a received impulse.

The horizontal and vertical components of the beam of light indicated by the numeral 25' are affected in the usual manner by a pair of parallel plates 26, 26, connected in circuit 26', 26', and a pair of parallel plates 27, 27, at right angles thereto and connected in circuit by leads 27', 27'. When these plates are energized they cause the beam of light to sweep in two directions as well understood in the action of a cathode ray tube and no further description is believed necessary. The function of the cathode ray tube 21 is to provide the desired sweep of the object upon which the records is to be made.

The beam of light 25' thus created and controlled, passes through a lens system indicated by the numeral 29 and thence to a record material indicated by the numeral 30. This record material may be any sensitized material capable of registering a sound or image impulse. In the preferred embodiment of the invention, the impulses are recorded on an ordinary sensitized moving picture film strip provided with sprocket holes 31. After the impulses are recorded on the film strip, for example, they may be reproduced and re-created in the manner hereinafter more fully described.

The arrangement shown in Fig. 1 illustrates the manner of employing a cathode ray tube to record sound or image impulses on a film strip, while in Fig. 2, the images or sound impulses on the record strip 30 are being reproduced or re-created by use of a photo cell 5 associated with the apparatus.

One of the important features of the novel process is the recording of sound or images crosswise of the film strip and this is accomplished by employing the scanning facilities of the cathode ray tube hereinbefore mentioned.

Fig. 3 diagrammatically illustrates a face view of a section of a sound record having a series of sound recordings indicated by the numeral 32, 32, each being overlapped on the other as indicated by the numeral 33. The records are shown as variable density recordings but they may also be variable width records of the several types known in the art of sound recordings, and they may also be overlapped, but it is apparent the patterns will be different than illustrated in the present drawings. Sprocket holes are omitted in the drawings but they may be included when the recordings are on a lengthy strip as is shown in the section of a strip of film in Fig. 1. The purpose of such a record is to record sounds more closely joined by the overlapping or fogging as illustrated by the uniformly dense lines 33 as set forth, and which will not be re-created by scanning of the record by apparatus set forth in reference to Fig. 2, and which is accomplished by adjusting the scanning beam of such a cathode ray tube or other scanning apparatus, or the focal alignment of an iconoscope or similar exteriorally radiating or non-visible scanning apparatus to the said sound recordings in order to avoid tracing the images of the overlapping lines thereby giving more perfect re-creations than would be possible if the scanning focus included the entire width of the sound tracks. The sound recordings are made continuous one with another, the same as in Fig. 1 and, likewise, they will be re-created in continuous order by traversing the images thereof for electro-responsively actuating apparatus as shown and described in reference to Fig. 2 and as shown in Fig. 6, as will be set forth hereinafter.

Fig. 4 diagrammatically illustrates a moving picture camera 34, having a lens 35. Associated with the camera is a microphone 36 connected by suitable wiring 37 and 38 to the input of an amplifier 39 whose output passes through wiring circuit 40. This circuit 40 connects with sound recording apparatus inside of the camera 34 and indicated by dotted lines 34 and may conveniently be of the type shown in Fig. 1 for producing a sound recording simultaneously with an image recording. Whichever type is employed the lens 35 focuses the image on a record material with the sound recordings, and such a record is diagrammatically illustrated in the face sectional view in Fig. 5. In this figure the numerals 41 and 41' illustrate moving picture images and the numerals 42 and 42' illustrate two groups of sound recordings, each of which is connected by a curved line of recording 43 but which may not always be of this particular pattern in connecting the two sets of recordings due to the timing of movement between intermitting. In operation of the recording, the sounds 42 are recorded and are made while the record material is at rest. The joined line or recording 43 is made while the record is in motion between the periods of intermitting. Likewise, in recording group 42 the recording group 42' is made during a period of non-moving of the record material produced by the intermittent apparatus of the moving picture camera, and it will be understood that a greater number of the sound and image records may be made along the length of the film strip and joined in like manner. Sprocket holes 31 are shown, the same as in Fig. 1, for moving the film along intermittently by well known sprocket propelling apparatus in the making and re-creating of the records. The re-creating of such a record of sound after developing and finishing, or from copies of such made in the various duplicating arts may be re-created by the method and apparatus Fig. 2 or Fig. 6. It will be understood that such records may be on materials other than perforated film and that the re-creating thereof may be effected while the record material is at rest. Furthermore such records may or may not move intermittently as set forth in reference to the several modified records herein described.

Fig. 5 is a front surface view of a sound and image record which is described more fully in reference to Fig. 6 which shows the record of Fig. 5 being re-created by sound translating apparatus. This apparatus is a modification of the apparatus shown in Fig. 2 but which may be somewhat similar or equivalent to it in the results obtained. The numeral 44 indicates a substantially constant radiating source projecting its rays through an optical system 45 thence onto the sound recordings 42 for reflecting therefrom into the end of an iconoscope indicated by the numeral 46. This tube includes an electric wire 47 which leads to the input of an amplifier 48 whose output leads to the input of the speaker illustrated by the numeral 49. In operation the light or invisible radiation from the source 44, as the case may be, casts a shadow of the sound recordings on the photo-sensitized plate inside of the iconoscope 46, or equivalent apparatus, and its scanning source therein scans the said reflections point by point successively and in continuity. This effect causes modulations of electrical current flow to pass therefrom to the input of amplifier 48, whose output causes sound re-creations in successive order of each individual sound variation included on each of the sound recording lines. In lieu of reflecting the sound recording images as shown, the iconoscope 46 may be on one side of the film and the radiating and optical system on the other for translating the recording variations through the film.

From the foregoing description it will be understood that the iconoscope 46 may be used in re-creating the various modifications of my recordings. Also, it will be understood that the image records may be re-created by such scanning apparatus simultaneously with the sounds or separately; also, the images may be projected simultaneously by regular optical methods.

Fig. 7 shows the image and sound records of Figs. 5 and 6 joined in recording lines and is illustrative of results obtained when either of the two records are transmitted to a distant point by a single scanning tube or other scanning apparatus and then received and registered by a single scanning tube or other scanning apparatus. However, spacing may be provided between the two images and the respective sound recordings alongside thereof by using intermitting rotating apparatus, if desired, and the two sets of image and sound recordings may, or may not, be joined as shown in Fig. 6, and these two results are produced by means described in reference to Fig. 6.

When sound records are in crosswise recordings, it is possible to include many times more the sound modulations than with a single sound track outstretched in straight line running to the film, as now commonly used in the talking picture art. Therefore, it is possible to project, or otherwise view, the images on a film for longer periods of time, and it can readily be seen that great advantage and saving of film and other record materials is accomplished. The crosswise sound recordings will be re-created by a substantially constant glow cathode ray tube sweeping in identical movements to the original in recording and the rays passing therefrom will shine or reflect onto a light sensitive cell having electrical connection to amplifier, or transmitting apparatus. Such crosswise sound records accompanying image records have particular advantage in projecting still images of all kinds, and they may be related or unrelated. The images may be projected by the present methods and apparatus used in stereopticon and moving pictures. However, the crosswise record lines require joining or overlapping when they include images in order to provide good projecting and viewing. The same cathode ray tube or its equivalent will register both records, when in combination, but it is also a purpose, whenever desired, to employ separate recording apparatus for the sound and image records. Also, the method will include making more than one set of image and sound records simultaneously on a single record material, or coupled materials. Furthermore, more than one sound or image record may be made simultaneously without combination. Still further arrangement of records made crosswise may be in side by side arrangement. Duplication and further multiplication may be carried out, and they may also be arranged in reversed running order when in duplication, etc. for the purpose set forth in my co-pending U. S. application Serial No. 296,482. One difference between the present application and the said application Serial No. 249,059 concerning to and fro sound recording is that the present application employs the related or accompanying sound recordings directly opposite the image or picture which has certain advantages over running them lengthwise with a series of images or pictures, especially in still picture or other facsimile recording and projecting and direct viewing. One example being in receiving and recording a sound program by radio with the accompanying picture of the entertainer or entertainers, etc. Another advantage is in receiving news matter and registering it with the comments of a news commentator therewith for re-creation, the image being projected onto a screen from its record, also directly viewed, and the sounds reproduced therewith.

My methods are applicable to stereopticon moving pictures and still images, including all kinds of facsimile. In such effects two or more images of like kind are usually made opposite each and with focusing lenses at different angles.

Image records, if desired, may include colored images. Also, if found advantageous, the sound records may be in any suitable color or combination of colors. Likewise, various combinations of colors may be applied to image records individually and in combination.

When necessary for conserving space, or, for other reasons, it is possible to record sounds on either, or both of the edges of a film having a sensitized coating. Also, prints may be made onto other films. If desired, duplicate sound records may be made simultaneously by reflecting light variations by mirrors, as will be understood. Also, prisms may be used for such duplication.

My methods will also include the use of images of all kinds made other than by photographic means on a film or strip. It is also an intent to include images in relief in all types of the records when desired for special purposes.

All of the types of my image and sound records will be found advantageous for business records and for many other uses too numerous to state. And the image and sound records may be together, or separate, as described for other uses. Also, the images may be projected, transmitted to other points, and viewed without projecting and transmitting.

While I have illustrated several embodiments and applications of my invention, many modifications will at once be apparent in addition to the several modifications set forth herein. Also, it is apparent that records being transmitted from one station to another may be slower than the transmitting speed for pictures in television when re-transmission takes place later on. Such slowing of the transmitting speed is a substitute for the expensive, if not prohibitive, co-axial cable for distance transmission of television images. The reception of the received television images is on a record of any suitable type which is re-created therefrom for television broadcasts through space, etc., within its range. And no limitation is to be placed on the number of stations in a network receiving the recorded images with and without sound. The apparatus for recording the images transmitted at slow speed for re-creating at faster speed over a television transmitter are subject to many modifications, too numerous to describe in this application.

Fig. 8 is a side view illustrating re-creating a sound record 50, of a suitable type, shown in edge view. The sound recordings may be on either of the flat surface sides 51 or 52, but preferably on the surface 51 nearer the iconoscope 53. Furthermore, sound recordings may be on both of the surfaces in the event different rays are used in re-creating as would be the case in super-imposing. Also, sound recordings may consist of two or more sets on any one surface when super-imposing is employed as will be more fully set forth hereinafter. The lamp 78 and its reflector 79 may project visible or invisible radiations through the record 50 as indicated by the dotted lines and they reach the iconoscope 53 as indicated by the dotted lines.

The sound recordings on the record 50 being variable in density or width, or otherwise variable, as the case may be, and which are produced by any one of several methods, will produce corresponding variable degrees of light, or invisible radiations, upon the sensitized plate of the iconoscope, or equivalent means, as has been described hereinbefore. The output wiring 54 from the iconoscope leads to the input of an amplifier 55 and the output wiring 56 from the amplifier 55 leads to a speaker 57, so that sounds are re-created in continuity as has been described in reference to Fig. 6. While the present illustration is for sound recordings alone, it will be understood that images may be included therewith as shown in Figs. 6 and 7 and they may be of one or more sets of images and either still or moving pictures. Also, the sound recordings may or may not be joined when in two or more sets, as may be preferable to suit various uses. Shutter means, electrical blanking-out means, etc., may be employed for effecting un-joined recording lines between sets of recordings. However, the many modifications are for meeting the various applications, but the simplified arrangement shown in Fig. 8 is preferable when sound records are to be re-created without image records therewith. It is apparent that such records will be repeated continuously when no means of cutting off the electrical functioning are employed or when no shutter means are provided between the iconoscope and the record or between the radiations and the record. Therefore, the invention set forth in the several figures may be used for repeating and without repeating. The record materials may be transparent or partially transparent as in celluloid film, glass, etc., but when invisible radiations are used the record material may be of such as considered opaque to visible light rays but capable of projecting through with invisible radiations. Optical means may be used between the lamp 54 and the record 50 whenever advantageous and the actinic power, size of record, and other conditions determine the use thereof. Likewise, in the Fig. 6 and other figures herein, the same optical changes may be made and it will be understood that further modifications may be made in all of the figures to effect efficient projecting and reflecting of radiations through, and to and from the recordings to the electrical translating means used.

Fig. 9 diagrammatically illustrates re-creating a sound record made on two surfaces of a record material 58. In this modification the sources of radiant beams indicated by lamps 61 and 62 radiate on the surface 59 of record 58 and lamps 63 and 64 radiate on the surface 60 of record 58. An iconoscope 53 is shown receiving the reflections from the recordings on surface 59 while iconoscope 53' is shown receiving the radiations from the recordings on the surface 60. The recordings on both surfaces of the record material may be re-created simultaneously by sound re-creating means including amplifying means electrically connected to the wiring of each of the iconoscopes as shown and described in reference to several of the preceding drawings. Also, if desired, the recordings on the surface 60 may be a continuation of the recordings on surface 59 of the record material 58, or they may be re-created line by line or in other divisions thereof of the recordings alternately by a single amplifier and speaker system as will be understood more fully in reference to the functioning of Figs. 10 and 11. These figures illustrate two sets of recordings on one surface of a record. Other modifications in the optical system and records used may be made as set forth in reference to Fig. 8.

Fig. 10 is a diagrammatic illustration of recording sound by two sets of cathode ray tubes 21 and 21' shown in side view and of the types shown in Figs. 1 and 2, but which may be of other suitable types, or equivalent recording means.

In the operation of this device, a microphone 65 receives the sound impulses and the electrical variations therefrom pass through the wiring 66 to an amplifier 67 whose output is simultaneously passed by wiring 68 and 69, respectively, to each of the cathode ray registering tubes indicated by the numerals 21 and 21'. These tubes are adapted to blank in and out alternately line by line by suitable electrical means included in the amplifier 67 and which are well known in the art of radio and television, therefore, further description of such functioning is believed unnecessary.

The result in recording on the sensitized film 70 is a continuous sound record starting at point 71 and across the record 70 and by tube 21 and continuing at point 72 by tube 21' across the record while tube 21 is electrically blanked out and then again starting at point 73 while tube 21' is electrically blanked out or vice versa. The action is repeated in other divisions whenever desired, for making a sound record continuous. It will be understood that the operation continues until the record is completed and that images may or may not be included therewith. Also, it will be understood that the recordings may be of the several types hereinbefore set forth. It is apparent the microphone 66 modulates the radiations coming from each of the tubes 21 and 21'.

Furthermore, it will be understood that a greater number of registering tubes or equivalent means may be employed for carrying out the recording method in making more lengthy records, and that whenever desired duplicate records may also be made by multiple functioning in recording. Optical means may be included when deemed necessary. Also recordings may be on two surfaces of a record.

Fig. 11 is a diagrammatic illustration of the finished record made in Fig. 10 being re-created by two iconoscopes 53 and 53' whose electrical output is fed into the input of an amplifier 55 by the wiring 54 and 54', respectively. The output of the amplifier is passed to the speaker 57 by means of the wiring 56. The flood radiating source 74 is projected onto the sets of recordings indicated by the numerals 75 and 76. These recordings are widely spaced apart in the diagram and are shown without variations along their paths in the figure and in Fig. 10, solely for illustrating the method and not for showing a particular type of recording some of which have been set forth hereinbefore. The iconoscopes 53 and 53' blank in and out similarly to the cathode ray recording tubes in Fig. 10 and it will be understood that the sound recording sets 75 and 76 will re-create alternately and in continuity in the same manner as they were recorded in Fig. 10 when the radiations from the flood lamp 74 reach the sensitized plates of each of the iconoscopes after being reflected from the sound recordings.

As set forth as a modification for Fig. 10, the recordings may be re-created from both surfaces of a record material alternately, and they may also be re-created by more sets of iconoscopes when more lengthy records are desired. Furthermore, multiple re-creations of a plurality of recordings may take place simultaneously and other spacing apart and alternate re-creating and recording may be made. Also, changes in the optical arrangement and more than one radiating source may be employed as set forth in reference to the several figures. Again, the recordings may be re-created by projecting through the record material as set forth in reference to Fig. 8.

While the records of the present invention are preferably made photographically and then duplicate records made by printing for final re-creating, yet, it will be understood that my method of re-creating may include reproducing sound from mechanically made recordings, or from etchings, engravings, etc., made in accordance to sound. Furthermore, printed paper copies may be made for re-creating therefrom, particularly when the sounds are to be re-created solely without images therewith and such prints will cost only a few cents or possibly less to produce thereby revolutionizing the sound art for use in the home and playable without mechanical rotating apparatus.

The records of sound with and without images may be transmitted by radio and television channels as has been set forth. Likewise, they may be received from distant points by such means, and in some instances they may be transmitted to great distances by wired circuit as will be understood. Also, sounds may be re-recorded by my methods from re-creations from other re-creating apparatus in lieu of sounds passed into the microphones shown in the several drawings by suitable electrical connections as will be understood without further drawings.

What I claim is:

1. The method of producing a sound record on record material by means of a radiating beam simultaneously with the recording of an image on the record material which comprises, maintaining said record at rest, modulating said beam in accordance with sound impulses and causing said beam to register said modulations on said record material in a series of lines substantially parallel on said material, and simultaneously registering images on said record material.

2. The method of producing a sound record on a sensitized photographic material by means of a radiating beam simultaneously with the recording of an image on the record material which comprises, maintaining said record at rest, modulating said beam in accordance with sound impulses and causing said beam to photographically register said modulations on said record material in a series of lines substantially parallel on said material, and simultaneously registering images on said record material.

3. The method of re-creating sound from a sound record material by means of a substantially constant radiating beam simultaneously with the re-creating of an image which comprises, maintaining said record at rest, scanning said record by said beam thereby causing said scanning beam to generate light variations, translating said light variations into electrical energy corresponding to said sound, and re-creating the sound from said electrical energy simultaneously with the reproduction of the image.

4. The method of re-creating a sound record produced on a record material in a path similar to that followed in producing a television image whose lines of recordings overlap, which comprises scanning the image recordings of the said sound record in substantially the same sweep movement as originally produced and by a scanning beam of substantially uniform intensity, moving the said beam in one line of movement at a greater distance than that employed in the making of the record for avoiding scanning the overlapped sides of each of the sound recording lines, and translating into electrical impulses the said sound recording lines and modulating electrical re-creating apparatus by said electrical impulses for producing more perfect sound effects.

5. The method of re-creating sound from a sound record material by means of a substantially constant radiating beam which comprises, maintaining said record at rest, scanning said record by said beam thereby causing said scanning beam to generate light variations, translating said light variations into electrical energy corresponding to said sound, and re-creating the sound from said electrical energy.

6. The method of producing image and sound records as defined in claim 6 which comprises, successively moving the record material in intermittent steps and repeating said above enumerated steps for producing a record having a series of image and sound registrations.

7. The method of re-creating a composite sound and image record as defined in claim 3 which comprises, successively moving the record material in intermittent steps and repeating said above enumerated steps for re-creating a record having a series of image and sound registrations.

LEE A. COLLINS.